(12) United States Patent
Jordan, Jr.

(10) Patent No.: US 8,942,711 B2
(45) Date of Patent: *Jan. 27, 2015

(54) LOCAL POINT OF PRESENCE

(71) Applicant: AT&T Intellectual Property I, L.P., Atlanta, GA (US)

(72) Inventor: Royce D. Jordan, Jr., Lawrenceville, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/672,048

(22) Filed: Nov. 8, 2012

(65) Prior Publication Data

US 2013/0065598 A1    Mar. 14, 2013

Related U.S. Application Data

(63) Continuation of application No. 13/409,714, filed on Mar. 1, 2012, now Pat. No. 8,331,945, which is a continuation of application No. 10/098,698, filed on Mar. 15, 2002, now Pat. No. 8,150,400.

(60) Provisional application No. 60/341,155, filed on Dec. 13, 2001.

(51) Int. Cl.
```
H04W 40/00      (2009.01)
H04W 48/00      (2009.01)
H04W 4/00       (2009.01)
H04W 40/20      (2009.01)
```

(52) U.S. Cl.
CPC ............... *H04W 48/17* (2013.01); *H04W 4/00* (2013.01); *H04W 40/20* (2013.01)

USPC ............... 455/445; 455/426.1; 455/432.1; 455/456.2; 455/461; 455/560; 455/422; 455/405

(58) Field of Classification Search
None
See application file for complete search history.

(56) References Cited

U.S. PATENT DOCUMENTS

| | | | |
|---|---|---|---|
| 5,559,800 | A | 9/1996 | Mousseau et al. |
| 5,890,064 | A * | 3/1999 | Widergen et al. ............ 455/445 |
| 5,913,166 | A | 6/1999 | Buttitta et al. |
| 5,966,654 | A | 10/1999 | Croughwell et al. |
| 6,185,425 | B1 | 2/2001 | Lindgren et al. |
| 6,195,558 | B1 | 2/2001 | Griffith et al. |
| 6,219,694 | B1 | 4/2001 | Lazaridis et al. |
| 6,308,070 | B1 | 10/2001 | Laster |
| 6,327,353 | B1 | 12/2001 | Fukuzawa et al. |
| 6,430,276 | B1 | 8/2002 | Bouvier et al. |
| 6,463,053 | B1 * | 10/2002 | Chen ............................ 370/352 |
| 6,714,797 | B1 | 3/2004 | Rautila |

(Continued)

OTHER PUBLICATIONS (190252-1850) Jordan; Final Office Action mailed Apr. 13, 2011 for U.S. Appl. No. 10/098,698, filed Mar. 15, 2002.

(Continued)

*Primary Examiner* — Willie J Daniel, Jr.
(74) *Attorney, Agent, or Firm* — Wolff & Samson, PC

(57) ABSTRACT

Systems and techniques for providing a telecommunications service by receiving a request for a telecommunications service from a wireless client, providing a local exchange point of presence to the wireless client in response to the request, and providing the telecommunications service to the wireless client through the local exchange point of presence. The local exchange point of presence may be based on the geographic location of the wireless client.

4 Claims, 6 Drawing Sheets

(56) References Cited

U.S. PATENT DOCUMENTS

| | | |
|---|---|---|
| 6,760,324 B1 * | 7/2004 | Scott et al. .................. 370/352 |
| 6,965,948 B1 | 11/2005 | Eneborg et al. |
| 7,027,575 B1 | 4/2006 | Burgess |
| 7,280,530 B2 | 10/2007 | Chang et al. |
| 8,150,400 B1 * | 4/2012 | Jordan, Jr. .................. 455/445 |
| 8,331,945 B2 * | 12/2012 | Jordan, Jr. .................. 455/445 |
| 2001/0036259 A1 | 11/2001 | Larger |
| 2002/0061100 A1 | 5/2002 | DiCamillo et al. |
| 2002/0128022 A1 | 9/2002 | Whitezel |
| 2003/0054810 A1 | 3/2003 | Chen et al. |
| 2003/0166403 A1 | 9/2003 | Hammer et al. |
| 2004/0132407 A1 | 7/2004 | Hein-Magnussen et al. |

OTHER PUBLICATIONS (190252-1850) Jordan; Notice of Allowance mailed Dec. 16, 2011 for U.S. Appl. No. 10/098,698, filed Mar. 15, 2002.

* cited by examiner

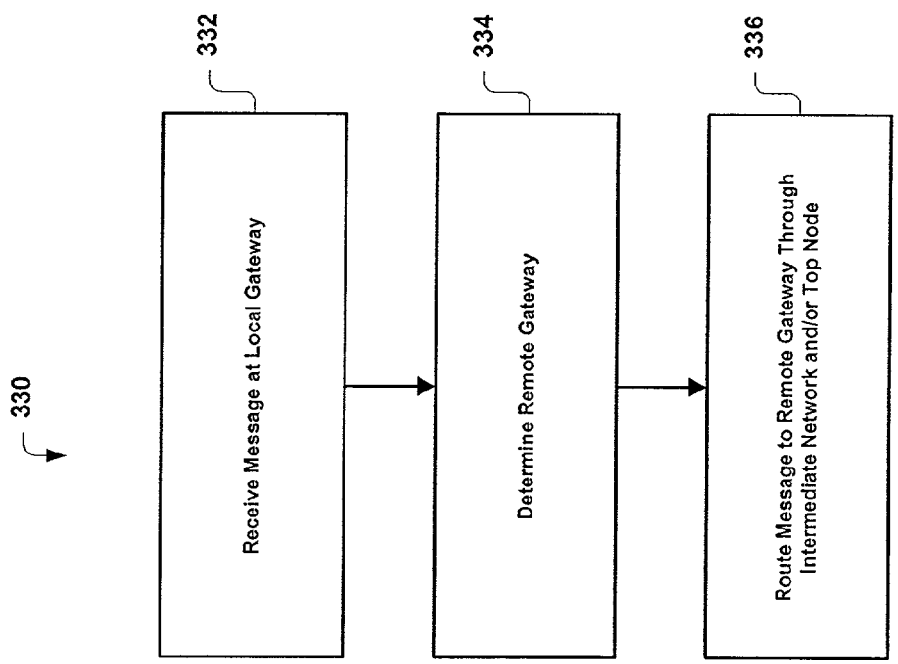

LOCAL POINT OF PRESENCE

This application is a continuation of U.S. utility application entitled, "Local Point of Presence," having Ser. No. 13/409,714, filed Mar. 1, 2012, which is a continuation of U.S. utility application entitled, "Local Point of Presence," having Ser. No. 10/098,698, filed Mar. 15, 2002, which claims the benefit of U.S. provisional application 60/341,155, filed Dec. 13, 2001, each of which is incorporated by reference in its entirety.

TECHNICAL FIELD

The present invention relates generally to a wireless communications system and, more particularly, to a wireless communications system having a local exchange point of presence (POP).

BACKGROUND

Telecommunications services are an integral part of business and personal communications, allowing geographically remote users to communicate irrespective of location. The costs incurred by users for engaging in remote communication, however, may vary depending on the origination location and/or destination location of the communication. For instance, a user may incur additional charges (e.g., long distance fees) beyond a normal subscription rate for communicating from a location outside of a predefined calling area.

In general, local exchange carriers (LECs), such as public telephone companies, for example, may only offer telecommunications services to users residing in certain local access and transport areas (LATAs). Each LATA may define a particular geographic area serviced by one or more LECs and may be established by regulations governing the provision and administration of telecommunications services. One example of a LEC is a pubic telephone company that provides local telecommunications services to subscribers located in geographic proximity to the central office, i.e., the local exchange, of the LEC.

Typically, placing a call between remote users located in different LATAs requires the services of an interexchange carrier (IXC) in addition to the services of the LECs. An example of an IXC is a long distance carrier such as AT&T, MCI, or Sprint. In general, the IXC establishes a connection between the remote LECs and charges a fee for providing long distance service.

The utilization of IXCs or long distance carriers results in increased costs to users. Accordingly, users would benefit from a communications system that enables geographically remote users to communicate while avoiding the long distance charges typically associated with such communication.

SUMMARY

In one general aspect, a telecommunications service is provided by receiving a request for a telecommunications service from a wireless client, providing a local exchange point of presence to the wireless client in response to the request, and providing the telecommunications service to the wireless client through the local exchange point of presence. The local exchange point of presence may be based on the geographic location of the wireless client.

Implementations may include one or more of the following features. For example, the telecommunications service may include a messaging service, an information service, a paging service, a voicemail service, a facsimile service, an interactive voice response service, and/or a text-to-speech service. The wireless client may include a mobile telephone, a personal digital assistant, and an interactive pager. A connection to the wireless client may be established, and the wireless device may display a menu of telecommunications services. Establishing a connection to the wireless device may include exchanging user information over a control channel. User input may be received through a graphical user interface displayed on the wireless client.

Providing the local exchange point of presence to the wireless client may include detecting a geographic location of the wireless client during call set-up, for example, referencing a lookup table associating geographic locations with local contact information, and providing a local telephone number and/or local IP address to the wireless client.

Providing the telecommunications service may include routing messages from a local gateway over an intermediate network or a top node to a remote gateway, thereby avoiding long distance charges. The intermediate network may include the Internet, the World Wide Web, and/or a telephone network. Providing the telecommunications service also may include communicating with a second wireless client or a server system from a second gateway local to the geographic location of the second wireless client or the server system. Routing messages from the first gateway to the second gateway through an intermediate network or a top node may avoid long distance charges. The requested telecommunications service may be provided by the server system.

Aspects of the present invention may be implemented by an apparatus and/or by a computer program stored on a computer readable medium. The computer readable medium may comprise, for example, a disk, a client device, a network device, and/or a propagated signal.

Other features will be apparent from the following description, including the drawings, and from the claims.

DESCRIPTION OF THE DRAWINGS

FIGS. 3-6 are flow charts of communications methods that may be implemented by the wireless communications system illustrated in FIGS. 1 and 2.

DETAILED DESCRIPTION

According to aspects of the present invention, telecommunications services are provided by receiving a request for a telecommunications service from a wireless client, providing a local exchange point of presence to the wireless client in response to the request, and providing the telecommunications service to the wireless client through the local exchange point of presence. The local exchange point of presence may be based on the geographic location of the wireless client.

Figure 1:
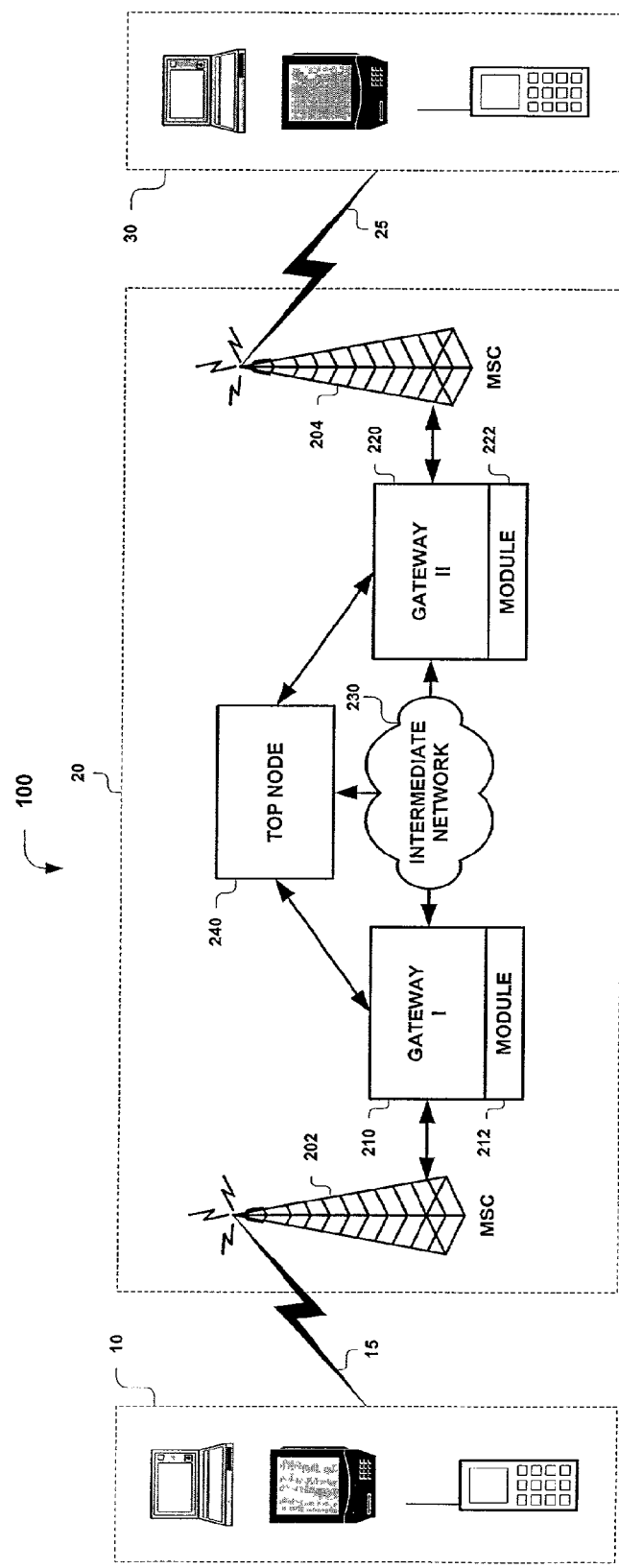
FIG. 1 is a block diagram illustrating aspects of a wireless communications system.

FIG. 1 illustrates an exemplary wireless communication system 100 having a local exchange point of presence. For brevity, several elements in the figure are represented as monolithic entities. The wireless communications system 100 may use, for example, Mobitex® technology of the Cingular Interactive Intelligent Wireless Network service provided by Cingular Wireless. Aspects of the Mobitex® network may include a two-way wireless data service capable of connecting to other complimentary networks. A wireless data service such as the Mobitex® network includes a hierarchy of communications systems that can provide nationwide wireless service through a network of base stations and local switches under the control of higher order regional switches or exchanges.

As shown, the wireless communications system 100 includes a first client 10 connected through a wireless network 20 to a second client 30. In one implementation, the first client 10 and/or the second client 30 may include a wireless device configured to communicate through the wireless network 20. The wireless device may include, for example, an Internet-enabled mobile telephone, an Internet-enabled personal digital assistant (PDA), an interactive pager such as one provided by Research in Motion (RIM) Inc., or any other type of personal computer having a digital processor capable of accessing the wireless network 20.

In general, the wireless devices will include hardware and/or software components for communicating with the wireless network 20 and may be structured and arranged to communicate using various communication protocols (e.g., HTTP, WAP) and encapsulation protocols (e.g., UDP) to establish connections (e.g., peer-to-peer) between network elements and/or to operate within or in concert with one or more other systems (e.g., the Internet and/or Web). The wireless devices also may include one or more software applications and/or computer programs for commanding and directing communications. The software applications and/or computer programs may be embodied permanently or temporarily in any type of machine, component, physical or virtual equipment, storage medium, or propagated signal capable of providing instructions to the wireless device. In particular, the software applications and/or computer programs may be stored on a storage media or device (e.g., EEPROM, magnetic diskette, or propagated signal) readable by a computer system, such that if the storage media or device is read by the computer system, the functions described herein are performed.

The wireless network 20 may directly or indirectly connect the first client 10 and the second client 30 irrespective of physical separation. For example, the first client 10 and the second client 30 may be located in different geographic locations (e.g., different LATAs). As shown in FIG. 1, the first client 10 communicates with the wireless network 20 through a first communication pathway 15, and the second client 30 communicates with the wireless network 20 through a second communication pathway 25. Generally, the fist communication pathway 15 and the second communication pathway 20 are wireless communication channels to the wireless network 20.

In one implementation, the wireless network 20 includes first and second mobile switching centers (MSCs) 202 and 204 for connecting to one or more wireless devices (e.g., first client 10 and second client 30). Although only two MSCs are illustrated in FIG. 1, it is to be understood that the wireless network 20 may include a larger number of MSCs. In general, each of the MSCs 202, 204 functions as an interface between the wireless devices and the wireless network 20. The MSCs 202, 204 may include transmitters, receivers, and switching devices for providing either digital or analog cellular telephone service and for performing switching functions to permit communication between wireless devices. The MSCs 202, 204 also may perform various communications functions such as user identification, subscription verification, location detection, mobile tracking, call processing, call routing, and/or other signaling functions necessary to control calls to and from other telecommunications and data systems.

The wireless network 20 further includes a first gateway 210 in communication with a second gateway 220. In general, the gateways 210, 220 are used for message transfer within the wireless network 20 and among interconnected networks (e.g., intermediate network 230). In some implementations, the gateways 210, 220 may perform protocol conversions that are necessary to enable communications through the intermediate network 220. For example, the first gateway 210 may carry out protocol conversion between a mobile communications protocol (e.g., WAP) employed by a wireless device (e.g., client 10) and an Internet communication protocol (e.g., HTTP, TCP/IP) employed by the intermediate network 220. Such protocol conversion may involve routing messages through a network gateway processor that transforms messages from a foreign protocol to a native protocol.

The gateways 210, 230 also may perform content encoding, such as the encoding of wireless markup language (WML) into binary format, and compilation of WMLScripts. Additionally, the gateways 210, 230 may manage the flow of data and the volume of communications traffic over the wireless network 20, by limiting bandwidth the size of data packets, for example, in order to preserve the integrity of the wireless network 20.

In one implementation, the first gateway 210 includes one or more devices operating under the command of a first control module 212, and the second gateway 220 includes one or more devices operating under the control of a second control module 222. One example of a device is a general-purpose computer capable of responding to and executing instructions. Other examples include a special-purpose computer, a personal computer (PC), a workstation, a server, a laptop, or any other component, machine, tool, equipment, or some combination thereof capable of responding to and executing instructions.

One example of a control module is a software application (e.g., operating system, browser application, micro-browser application, server application, proxy application, gateway application, tunneling application, ISP application, and/or other communication application) loaded on one or more devices that commands and directs the communications enabled by the device. Other examples include a computer program, a piece of code, an instruction, another device, or some combination thereof. The control module may be implemented as software code utilizing any suitable computer language (e.g., Java, Perl, C or C++) using object-oriented techniques, for example. The control module also may be a computer, such as a workstation or PC, a microprocessor, a network server, a Java virtual machine, or an application specific integrated circuit, using any suitable type of computer instructions.

The control module 212 may be embodied permanently or temporarily in any type of machine, component, physical or virtual equipment, storage medium, or propagated signal capable of providing instructions to a device. In particular, the control module (e.g., software application, computer program) may be stored on a storage medium or device (e.g., ROM, magnetic diskette, or propagated signal) readable by a general or special purpose computer system, such that if the storage media or device is read by the computer system, the functions described herein are performed.

The first gateway 210 and the second gateway 220 may be configured from a standard Santa Cruz Operation (SCO) UNIX system running an Internet-accessible operating system such as Windows NT by Microsoft. The system may use TCP/IP and UDP for communications and hypertext markup language (HTML) to support Internet web browsers, including those provided by Netscape and Microsoft. The computer language used by the gateways 210 and 220 may be in, for example, the C programming language, Java or HTML.

In one implementation, the first gateway 210 communicates with the second gateway 220 through an intermediate network 230. In general, the intermediate network 230 functions as a delivery system for carrying and routing messages between the first gateway 210 and the second gateway 220. The intermediate network 230 may include and/or form part of an information delivery network, such as, for example the Internet, the World Wide Web, and/or an analog or digital wireless telecommunications network that provides information.

The information delivery network may support a variety of telecommunications and/or data services including, for example, Internet and/or web access, e-mail and/or instant messaging services, paging services, audio and/or video streaming, and/or directory services. Examples of information delivery networks include, but are not limited to, a local area network (LAN), a wide area network (WAN), a telephone network (e.g., analog, digital, wired, wireless, PSTN, ISDN, or xDSL), a radio network, a television network, a cable network, a satellite network, and/or any other communications network configured to carry data. Each network may include one or more elements, such as, for example, intermediate nodes, proxy servers, routers, switches, adapters, and wired or wireless data pathways, configured to direct and/or deliver data.

In another implementation, the first gateway 210 and the second gateway 230 communicate through a top node 240. In general, the top node 240 acts as an intermediate switching point for messages sent among remote gateways, such as the first gateway 210 and the second gateway 220. The top mode 240 may act in conjunction with the intermediate network 230 to facilitate the delivery of messages between the first gateway 210 and the second gateway 220.

The top node 240 may be implemented as an intermediate node or gateway positioned between an origination gateway (e.g., gateway 210) and a destination gateway (e.g., gateway 220). When used in this capacity, the top node 240 may be configured to receive an incoming message from the origination gateway, determine the most efficient path to the destination gateway, and forward the message to the destination gateway along the most efficient path. Forwarding the message to the destination gateway may involve sending the message to one or more elements, such as, for example, intermediate nodes, gateways, proxy servers, routers, switches, adapters, and wired or wireless data pathways, configured to direct and/or deliver data.

Figure 2:
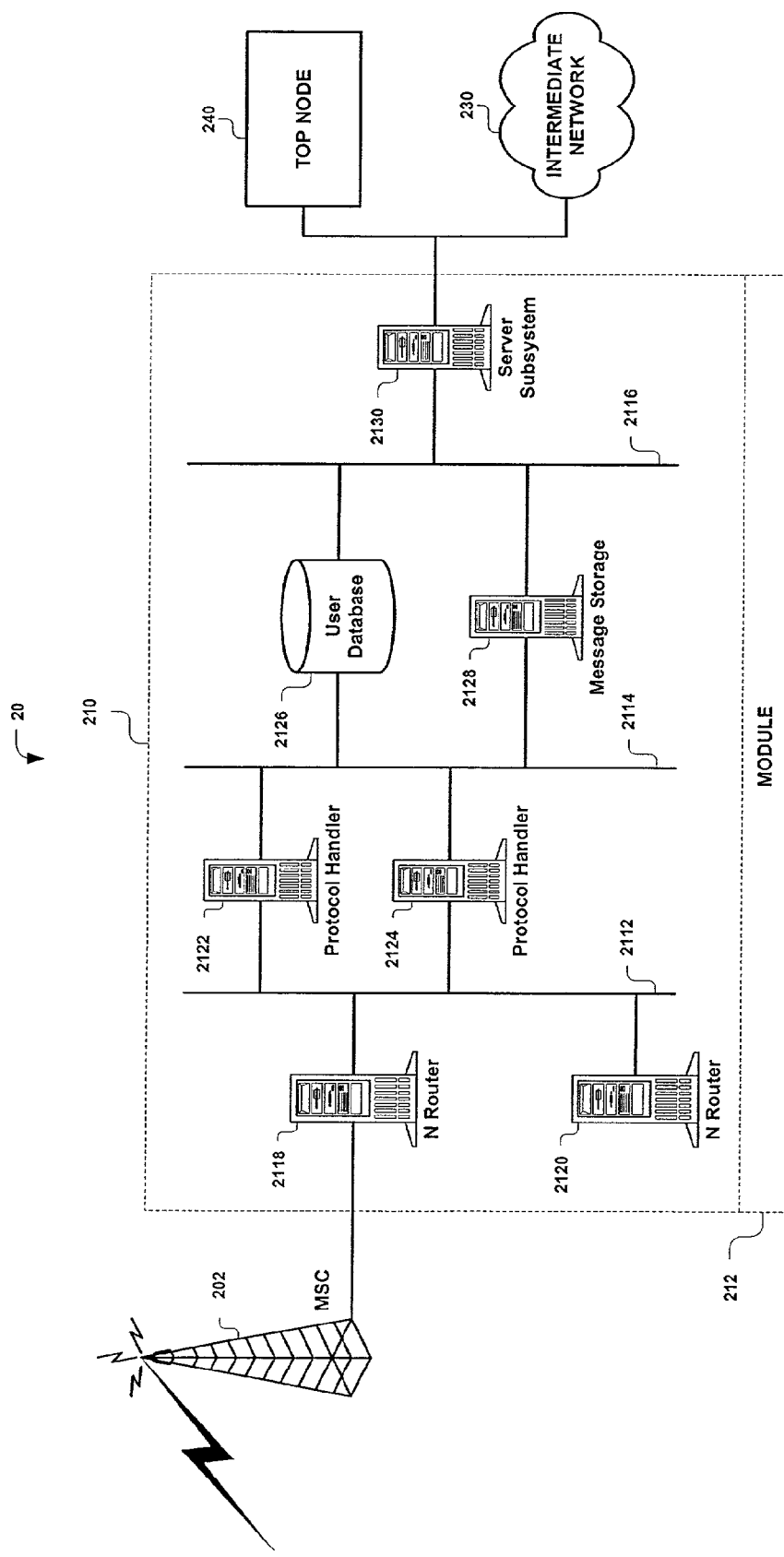
FIG. 2 is a block diagram expansion of aspects of FIG. 1.

Referring to FIG. 2, a block diagram expansion of FIG. 1 focuses primarily on one implementation of the wireless network 20 and, in particular, on aspects of the gateway 210. In one implementation, the wireless communications system 100 includes a wireless network 20 having a first gateway 210 configured to provide a local exchange POP. The first gateway 210 may operate under the direction of a first control module 212 (e.g., software code) installed on one or more devices of the first gateway 210.

It is to be understood that while the following description of FIG. 2 uses the gateway 210 to illustrate certain aspects of the present invention, the description may be applicable as well to other elements of the communications system 100 (e.g., gateway 220, top node 240). For example, in some implementations, the wireless communications system 100 includes a wireless network 20 having a second gateway 220 configured to provide a local exchange POP. In such an implementation, the second gateway 220 may function under the direction of a second control module 222 (e.g., software code) installed on one or more devices of the second gateway 220.

As shown in FIG. 2, the wireless network 20 includes a gateway 210 in communication with a MSC 202, an intermediate network 230, and a top node 240. The gateway 210 operates under the direction of control module 212. The broken lines are intended to indicate that in some implementations, the control module 212, or portions thereof considered collectively, may instruct one or more elements of the gateway 210 to operate as described. Accordingly, the function of providing a local exchange POP may be implemented as software controlling one or more elements of the gateway 210.

In one implementation, the gateway 210 includes one or more internal networks 2112, 2114, and 2116, such as local area networks (LANs), configured to interconnect various elements of the gateway 210. For example, the internal networks 2112, 2114, and 2116 may interconnect components including Nrouters 2118 and 2120, protocol handlers 2122 and 2124, a user database 2126, a message store 2128, and a server subsystem 2130.

At the gateway 210, the Nrouters 2118 and 2120 communicate with one or more MSCs 202 including regional switches residing at remote locations. The communication between the regional MSC 202 and the Nrouters 2118, 2120 may use, for example, an X.25 protocol. Generally, the Nrouters 2118 and 2120 are configured to route and deliver messages received at the MSC 202 to various elements within the wireless network 20. Each of the Nrouters 2118 and 2120 may include one or more dual-ported connectivity cards, for example, those provided by Eicon Networks, so that each Nrouter may support multiple Fast-Sequenced Transport (FST) connections. In one implementation, the gateway 210 can handle up to 255 Nrouters.

The Nrouters 2118 and 2120 may communicate with protocol handlers 2122, 2124 over an internal network 2112 using, for example, X-sockets. In general, the protocol handlers 2122 and 2124 are configured to provide support for any customized protocols (e.g., application-specific protocols) necessary to access customized objects. For example, if a particular object is supported by a protocol other than a standard communication protocol (e.g., HTTP, TCP/IP), the protocol handlers 2122 and 2124 may use a specified application protocol to retrieve and access the particular object. In one implementation, the protocols handled by protocol handlers 2122, 2124 may specify that message storage and internal e-mail access may be handled by the UNIX standard Network File System (NFS) distributed file system from SUNSOFT, which allows data to be shared across the network regardless of the protocol. Each protocol handler 2122 and 2124 also may maintain a database cache (not shown) configured to maintain recently accessed data in order to increase the speed of internal network communications and to limit database access requests over the internal networks 2112, 2114 and 2116.

Additionally, the protocol handlers 2122, 2124 may process information contained in user database machines, such as user database 2126. The protocol handlers 2122, 2124 may use data from the user database 2126 to communicate with other systems or networks external to the gateway 210. Generally, the user database 2126 contains an interface to content addressable memory (CAM) (not shown) for updating information, e.g., user account information and status. Each user associated with the wireless communications system 100 may have an account maintained in the user database 2126 including a unique identifier, such as a MOBITEX® access number, for example. Information maintained in the user database 2126 may be used to validate users, monitor usage, and maintain billing information.

The gateway 210 also may include a message storage server 2128 configured to store and forward messages (e.g., e-mail, voice, fax, data) intended for one or more recipients.

The intended recipient may be a user of the wireless network 20 that has subscribed to receive one or more interactive messaging features. The message storage server 2128 may include a system of folders configured to store interactive messaging content associated with subscribers. Interactive messaging provides, for example, a way of communicating with the ability of sending, receiving, and forwarding text messages, voice message, e-mail messages, and/or facsimile messages. The message storage server 2128 may store various content associated with interactive messaging and allow users to retrieve and manage such content.

The message storage server 2128 also may contain various routing and delivery program modules configured to deliver messages to a recipient or to an intermediate component for subsequent delivery to a recipient. One or more backup databases or servers may be used in the gateway 210, with each backup database being synched automatically by sockets communications.

As shown in FIG. 2, the wireless network 20 and, in particular, the gateway 210 includes a server subsystem 2130. Generally, the server subsystem 2130 is configured to provide interactive communications services such as, for example, messaging services, information services, paging services, voicemail services, facsimile services, interactive voice response (IVR) services, and text-to-speech services. In particular, mobile-to-mobile text messaging allows a sender to create and transmit text messages using the mobile number of a recipient. E-mail messaging allows a sender to address e-mail messages using the mobile number of a recipient. Web messaging allows users to send personalized text messages from a public Web site. Users may subscribe to information services and receive alerts concerning news, stock quotes, sports scores, entertainment, or other information displayed on a digital mobile phone. Users may send and receive numeric and/or alphanumeric pages; send and retrieve voice-mail messages; and send, receive, forward, and/or print out faxes using a digital phone and a fax machine. IVR services process remote touch-tone entries from users to query a database and obtain computerized voice responses. Text-to-speech services allow users having only telephone access to have a text message converted into audio format.

Figure 3:
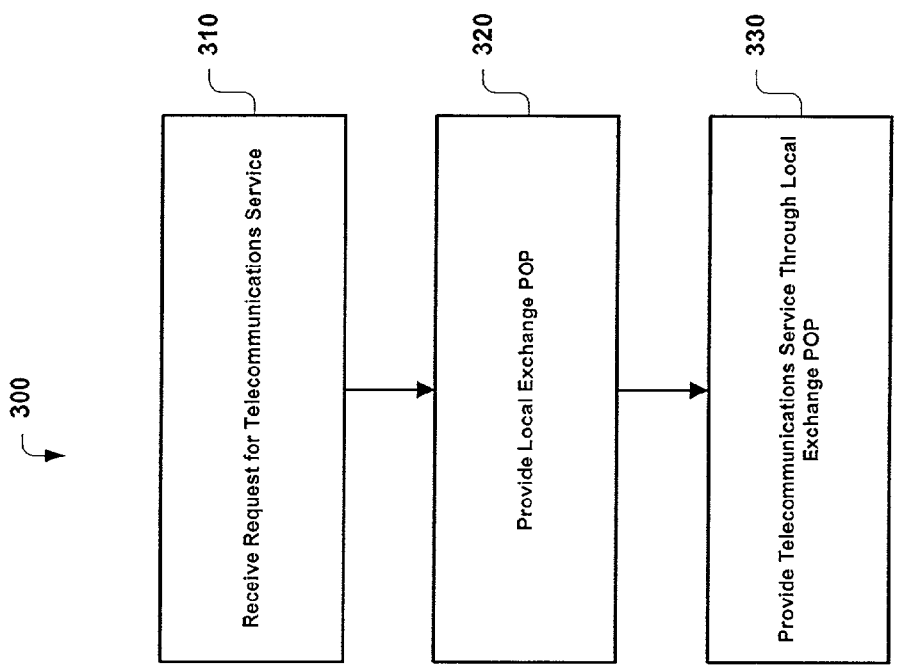

Referring to FIG. 3, an embodiment of the wireless communications system 100 operates according to a procedure 300 for providing a local exchange point of presence (POP) to one or more wireless users. In general, the procedure 300 includes receiving a request for a telecommunications service (step 310), providing a local exchange POP (step 320), and providing telecommunications service through the local exchange POP (step 330). The procedure 300 may be implemented by any suitable type of hardware (e.g., device, computer, computer system, equipment, component); software (e.g., program, application, instructions, code); storage medium (e.g., disk, external memory, internal memory, propagated signal); or combination thereof.

At step 310, a request for a telecommunications service is received from a wireless client. In general, the wireless client (e.g., first client 10) may request telecommunications services if the wireless client is physically located in an area serviced by a particular telecommunications system (e.g., wireless network 20). The wireless client (e.g., first client 10) may operate in a mobile environment and may include, for example, a mobile telephone, a personal digital assistant, and/or an interactive pager. If service is available, the wireless client may request and receive telecommunications services including a messaging service, an information service, a paging service, a voicemail service, a facsimile service, an IVR service, and/or a text-to-speech service.

Figure 4:
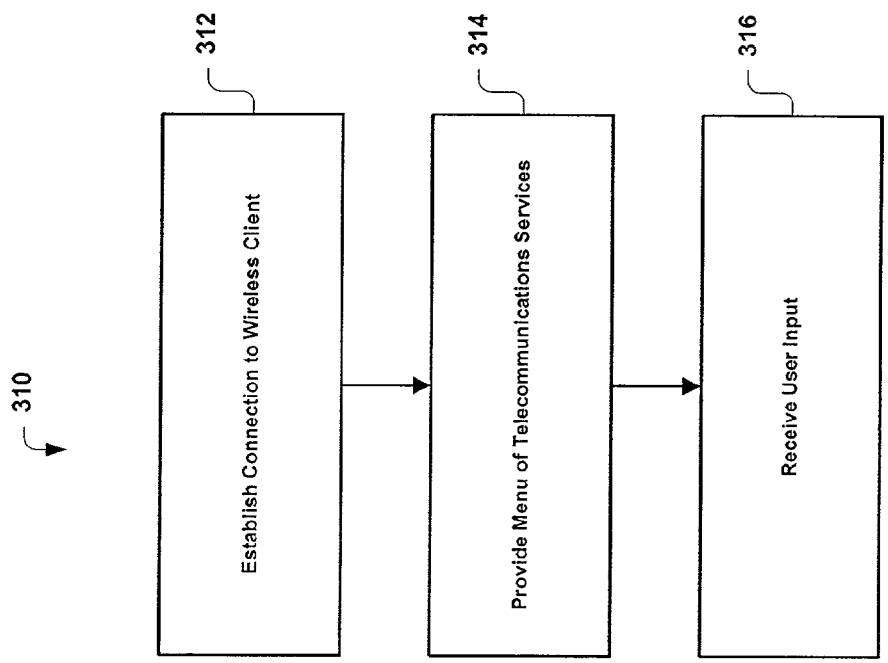

Further details regarding an embodiment of the procedure 300 are provided by the flow chart depicted in FIG. 4. In particular, the process of requesting a telecommunications service (step 310) may include establishing a connection to the wireless client (step 312), providing a menu of telecommunications services (step 314) and receiving user input (step 316).

In one implementation, the wireless network 20 establishes a connection to the first client 10 through the first gateway 210. Establishing a connection may include exchanging user information over a control channel. The wireless network 20 may examine the user information to verify that telecommunications services are available to the first client 10.

After the connecting to the first client 10, the wireless network 20 may transmit a menu of available telecommunications services at step 314. The first client 10 may display the menu as a graphical user interface. By interacting with the graphical user interface, a user may select a telecommunication service from the menu. Interacting with the graphical user interface may involve providing user input by scrolling through pages, selecting various icons, and/or entering text at step 316. The user input may be received through a graphical user interface displayed on the wireless client and sent to the wireless network 20.

At step 320, a local exchange point of presence based on the geographic location of the wireless client is provided in response to the request. The local exchange point of presence may be provided by a telecommunications system, such as the wireless network 20. In one implementation, the wireless network 20 communicates with a first client 10 that is geographically located outside of an assigned calling area. The assigned calling area may be a geographic area (e.g., LATA) encompassing a business or residential address associated with the first client 10. Although the first client 10 may be located far from an assigned calling area, the first client 10 still may be located close to a first gateway 210 of the wireless network 20. Accordingly, communication between the first client 10 and the first gateway 210 may be considered local, e.g., inter-LATA communication.

Figure 5:
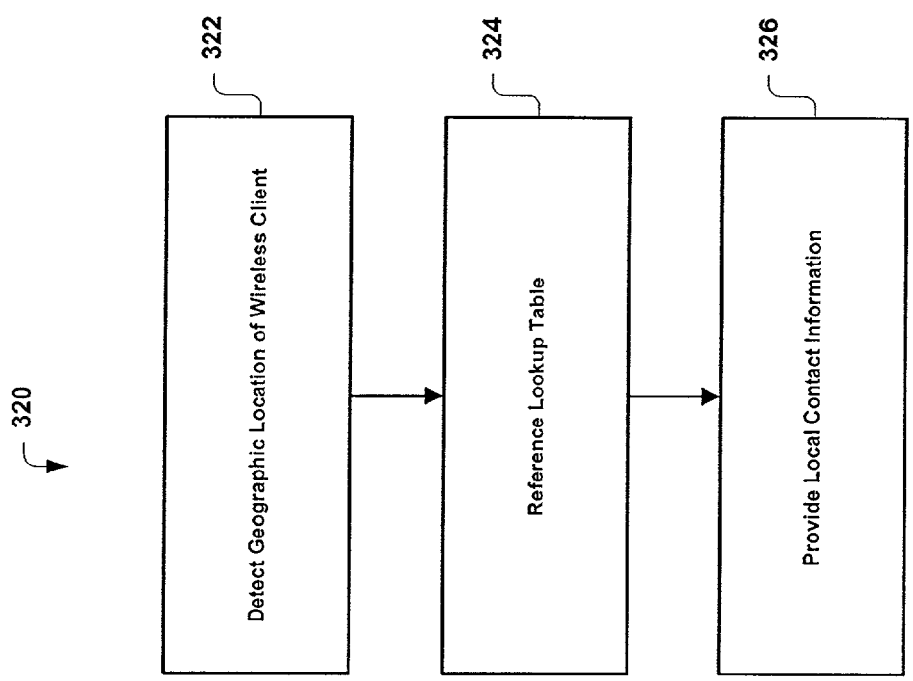

Further details regarding an embodiment of the procedure 300 are provided by the flow chart depicted in FIG. 5. In particular, the process of providing a local exchange POP (step 320) may include detecting a geographic location of the wireless client (step 322), referencing a lookup table (step 324), and providing local contact information (step 326).

In one implementation, the wireless network 20 detects the geographic location of the first client 10. The geographic location of the first client 10 may be detected at step 320 during call set-up, for example. For example, the first client 10 may transmit control signals including location identifiers to the wireless network 20 to establish a connection. Alternatively, the wireless network 20 may determine the location of the first client 10 automatically based on the strength of the signals transmission from the first client 10.

After determining the geographic location of the first client 10, at step 324 the wireless network 20 references a lookup table that associates geographic locations with local contact information. In general, the lookup table may include a searchable database that provides local contact information corresponding to specific geographic locations. The local contact information then is provided to the first client 10 at step 326. The local contact information may include a local telephone number and/or local IP address associated with a local exchange POP. The local exchange POP may be provided by a gateway located in the central office of an LEC, for example.

At step 330, the requested telecommunications service is provided to the wireless client through the local exchange POP. In general, the local exchange POP is located in geographic proximity to the wireless client. Accordingly, any telecommunications services provided to the wireless client through the local exchange POP do not incur long distance charges.

Further details regarding an embodiment of the procedure 300 are provided by the flow chart depicted in FIG. 6. In particular, the process of providing a telecommunications service through the local exchange POP (step 330) may include receiving a message at a local gateway (step 332), determining a remote gateway (step 334), and routing the message to the remote gateway through an intermediate network and/or a top node (step 336).

In one implementation, at step 332 the wireless network 20 receives a message from a first client 10 at a local gateway (e.g., first gateway 210). The message may be any voice and/or data communication associated with the requested telecommunications service. The first gateway 210 may receive the message through a local exchange POP in geographic proximity (e.g., within the same LATA) to the first client 10.

After receiving the message from the first client 10, at step 334 the wireless network 20 may determine a remote gateway (e.g., second gateway 220) associated with the message. Determining a remote gateway generally may be desirable when a received message is intended for a remote recipient (e.g., second client 30) and/or a remote server system. In order to deliver the message, an appropriate gateway associated with the remote recipient and/or remote user may be determined.

The appropriate gateway may be a gateway located in close proximity to the remote recipient and/or the remote server system so that the gateway may communicate locally with the recipient or remote system. Determining an appropriate gateway may involve detecting the location of the recipient and/or server system and determining the closest gateway to the location of the recipient and/or server system.

In one implementation, the second gateway 220 is determined to be an appropriate remote gateway. The message received at the first gateway 210 may be routed at step 336 to the second gateway 220 through an intermediate network 230 and/or the top node 240. In general, the intermediate network 230 functions as a delivery system for carrying and routing messages between the first gateway 210 and the second gateway 220. The intermediate network 230 may include the Internet, the World Wide Web, and/or a telephone network. The top node 240 acts as an intermediate switching point for messages sent from the first gateway 210 to the second gateway 220. Routing messages from the first gateway 210 to the second gateway 220 through the intermediate network 230 and/or the top node 240 avoids long distance charges typically associated with remote communication.

In some implementation, the second gateway 220 is configured to provide a local exchange POP to the second client 30. Therefore, a user associated with the second client 30 may request a telecommunications service from the second gateway 220, which is located in geographic proximity to the second client 30. Even if the second client 30 is outside of an assigned calling area, the second client 30 may be used to retrieve a message sent from the first client 10 without incurring long distance charges.

A number of implementations have been described. Nevertheless, it will be understood that various modifications may be made and that other implementations are within the scope of the following claims.

What is claimed is:

1. A method, comprising:
receiving a request for a telecommunications service from a first wireless device assigned to a first calling area by receiving an indication of a selection of the telecommunications service from a graphical menu displayed on the first wireless device, the graphical menu displaying available telecommunications services;
in response to receiving the request for the telecommunication service, determining that a current geographic location of the first wireless device is in a second calling area by detecting a location identifier transmitted by the first wireless device;
determining a local first gateway in the second calling area closest to the first wireless device based on the current geographic location of the first wireless device, the local first gateway to provide a local exchange point of presence to the first wireless device, wherein determining the local first gateway in the second calling area comprises referencing a lookup table associated with the local first gateway, wherein referencing the lookup table associated with the local first gateway comprises referencing a searchable database comprising local contact information corresponding to geographic locations, wherein the local exchange point of presence comprises a local telephone number that is provided to the first wireless device;
providing the telecommunications service to the first wireless device via the local exchange point of presence by communicating with the first wireless device from the local first gateway local to the geographic location of the first wireless device and routing messages from the local first gateway over an intermediate network to a remote second gateway;
communicating with a second wireless device via the remote second gateway local to a geographic location of the second wireless device, the local first gateway and the remote second gateway being geographically remote from each other; and
based on receipt at the local first gateway of a voice communication from the first wireless device intended for the second wireless device proximate to the remote second gateway, routing the voice communication through an intermediate network from the local first gateway to the remote second gateway.

2. A non-transitory computer readable medium embodied with computer program instructions, which, when executed on a processor, cause the processor to perform operations comprising:
receiving a request for a telecommunications service from a first wireless device assigned to a first calling area by receiving an indication of a selection of the telecommunications service from a graphical menu displayed on the first wireless device, the graphical menu displaying available telecommunications services;
in response to receiving the request for the telecommunication service, determining that a current geographic location of the first wireless device is in a second calling area by detecting a location identifier transmitted by the first wireless device;
determining a local first gateway in the second calling area closest to the first wireless device based on the current geographic location of the first wireless device, the local first gateway to provide a local exchange point of presence to the first wireless device, wherein determining the local first gateway in the second calling area comprises referencing a lookup table associated with the local first gateway, wherein referencing the lookup table associated with the local first gateway comprises referencing a searchable database comprising local contact information corresponding to geographic locations, wherein the local exchange point of presence comprises a local telephone number that is provided to the first wireless device;

providing the telecommunications service to the first wireless device via the local exchange point of presence by communicating with the first wireless device from the local first gateway local to the geographic location of the first wireless device and routing messages from the local first gateway over an intermediate network to a remote second gateway;

communicating with a second wireless device via the remote second gateway local to a geographic location of the second wireless device, the local first gateway and the remote second gateway being geographically remote from each other; and based on receipt at the local first gateway of a voice communication from the first wireless device intended for the second wireless device proximate to the remote second gateway, routing the voice communication through an intermediate network from the local first gateway to the remote second gateway.

3. The non-transitory computer readable medium of claim 2, wherein receiving a request for a telecommunications service from a first wireless device assigned to a first calling area comprises:

verifying the telecommunications service is available for the first wireless device.

4. An apparatus, comprising:

a memory storing computer program instructions; and a processor communicatively coupled to the memory, the processor to execute the computer program instructions, which, when executed on the processor, cause the processor to perform operations comprising:

receiving a request for a telecommunications service from a first wireless device assigned to a first calling area by receiving an indication of a selection of the telecommunications service from a graphical menu displayed on the first wireless device, the graphical menu displaying available telecommunications services, wherein receiving the request for the telecommunications service from the first wireless device assigned to the first calling area comprises verifying the telecommunications service is available for the first wireless device;

in response to receiving the request for the telecommunication service, determining that a current geographic location of the first wireless device is in a second calling area by detecting a location identifier transmitted by the first wireless device;

determining a local first gateway in the second calling area closest to the first wireless device based on the current geographic location of the first wireless device, the local first gateway to provide a local exchange point of presence to the first wireless device, wherein determining the local first gateway in the second calling area comprises referencing a lookup table associated with the local first gateway, wherein referencing the lookup table associated with the local first gateway comprises referencing a searchable database comprising local contact information corresponding to geographic locations, wherein the local exchange point of presence comprises a local telephone number that is provided to the first wireless device;

providing the telecommunications service to the first wireless device via the local exchange point of presence by communicating with the first wireless device from the local first gateway local to the geographic location of the first wireless device and routing messages from the local first gateway over an intermediate network to a remote second gateway;

communicating with a second wireless device via the remote second gateway local to a geographic location of the second wireless device, the local first gateway and the remote second gateway being geographically remote from each other; and based on receipt at the local first gateway of a voice communication from the first wireless device intended for the second wireless device proximate to the remote second gateway, routing the voice communication through an intermediate network from the local first gateway to the remote second gateway.

\* \* \* \* \*